(12) United States Patent
Karnicki et al.

(10) Patent No.: US 10,920,420 B2
(45) Date of Patent: Feb. 16, 2021

(54) MODIFIED OSB BOARD AND ITS USE IN WALLS FOR HOUSE BUILDING SYSTEMS

(71) Applicant: SWISS KRONO Tec AG, Lucerne (CH)

(72) Inventors: Maciej Karnicki, Zielona Gora (PL); Rafal Przedaszek, Zary (PL); Jaroslaw Masina, Krosno Odrzanskie (PL); Piotr Kaczmarek, Wilkanowo (PL); Slawomir Rogowski, Zary (PL); Andrzej Lipinski, Zary (PL); Grzegorz Stachów, Zary (PL); Stanislaw Dobras, Zary (PL); Krzysztof Przygodzki, Lipinki Luzyckie (PL)

(73) Assignee: SWISS KRONO Tec AG, Lucerne (CH)

( * ) Notice: Subject to any disclaimer, the term of this patent is extended or adjusted under 35 U.S.C. 154(b) by 0 days.

(21) Appl. No.: 15/738,729

(22) PCT Filed: Jun. 10, 2016

(86) PCT No.: PCT/EP2016/063326
§ 371 (c)(1),
(2) Date: Dec. 21, 2017

(87) PCT Pub. No.: WO2016/206995
PCT Pub. Date: Dec. 29, 2016

(65) Prior Publication Data
US 2018/0179754 A1    Jun. 28, 2018

(30) Foreign Application Priority Data

Jun. 25, 2015 (EP) ..................................... 15173828
Oct. 15, 2015 (EP) ..................................... 15189959

(51) Int. Cl.
*E04C 2/16* (2006.01)
*B32B 21/02* (2006.01)
(Continued)

(52) U.S. Cl.
CPC ................ *E04C 2/16* (2013.01); *B27N 7/005* (2013.01); *B32B 3/06* (2013.01); *B32B 7/12* (2013.01);
(Continued)

(58) Field of Classification Search
CPC ..... E04C 2/16; E04C 2/24; E04C 2/10; E04B 2/70; E04B 1/10; B32B 29/005;
(Continued)

(56) References Cited

U.S. PATENT DOCUMENTS 4,490,198 A * 12/1984 Mitchell ................... B44C 7/06
    156/267
6,010,793 A    1/2000 Yoshimura et al.
(Continued)

FOREIGN PATENT DOCUMENTS

DE        19939060 A1    2/2001
DE     102005021156 A1    11/2006
(Continued)

OTHER PUBLICATIONS

BMK GmbH, Overlay—Technical product sheet, http://www.melamine-papers.com/index.php?index=1&lng=de&menuid=12, pp. 1 (published prior to Jun. 25, 2015).
(Continued)

*Primary Examiner* — Brian E Glessner
*Assistant Examiner* — Adam G Barlow
(74) *Attorney, Agent, or Firm* — The Webb Law Firm

(57) ABSTRACT

The present invention relates to a modified OSB board (oriented strand board) with an upper side and a lower side. The upper and/or lower side of the board are coated with at
(Continued)

least two paper layers. The first paper layer is impregnated with at least one resin and the second paper layer is a raw paper layer. The invention relates further to a construction wall for a house building system, to a partition wall for a house building system and a house building system.

24 Claims, 12 Drawing Sheets

(51) Int. Cl.
| | |
|---|---|
| *B32B 21/06* | (2006.01) |
| *B32B 3/06* | (2006.01) |
| *B32B 21/08* | (2006.01) |
| *B32B 15/20* | (2006.01) |
| *B32B 7/12* | (2006.01) |
| *B27N 7/00* | (2006.01) |
| *B32B 15/12* | (2006.01) |
| *E04C 2/10* | (2006.01) |
| *E04B 1/10* | (2006.01) |
| *E04C 2/24* | (2006.01) |
| *B32B 21/04* | (2006.01) |
| *B32B 29/00* | (2006.01) |
| *E04B 2/70* | (2006.01) |
| *E04B 2/74* | (2006.01) |
| *E04B 1/76* | (2006.01) |
| *E04C 2/00* | (2006.01) |

(52) U.S. Cl.
CPC .............. *B32B 15/12* (2013.01); *B32B 15/20* (2013.01); *B32B 21/02* (2013.01); *B32B 21/042* (2013.01); *B32B 21/06* (2013.01); *B32B 21/08* (2013.01); *B32B 29/005* (2013.01); *E04B 1/10* (2013.01); *E04B 2/70* (2013.01); *E04C 2/10* (2013.01); *E04C 2/24* (2013.01); *B32B 2250/44* (2013.01); *B32B 2260/028* (2013.01); *B32B 2260/046* (2013.01); *B32B 2307/304* (2013.01); *B32B 2307/416* (2013.01); *B32B 2307/718* (2013.01); *B32B 2419/04* (2013.01); *B32B 2607/00* (2013.01); *E04B 1/7654* (2013.01); *E04B 2/707* (2013.01); *E04B 2/7401* (2013.01); *E04B 2103/04* (2013.01); *E04C 2002/004* (2013.01)

(58) Field of Classification Search
CPC ........... B32B 3/06; B32B 15/12; B32B 21/08; B32B 21/06; B27N 7/005
See application file for complete search history.

(56) References Cited

U.S. PATENT DOCUMENTS

| | | | |
|---|---|---|---|
| 7,640,664 B1* | 1/2010 | Bailey | B27N 3/04 |
| | | | 29/897.32 |
| 7,658,040 B2 | 2/2010 | Bennett et al. | |
| 8,025,978 B2* | 9/2011 | Ruhdorfer | B32B 29/005 |
| | | | 428/532 |
| 9,422,727 B2* | 8/2016 | Sjoberg | E04F 15/02 |
| 9,556,622 B2* | 1/2017 | Pervan | B32B 21/02 |
| 2005/0229504 A1* | 10/2005 | Bennett | E04B 1/762 |
| | | | 52/105 |
| 2005/0284064 A1 | 12/2005 | Price | |
| 2007/0087936 A1* | 4/2007 | Shiratsuchi | B41M 5/5227 |
| | | | 503/201 |
| 2008/0199672 A1 | 8/2008 | Ruhdorfer | |
| 2010/0092731 A1* | 4/2010 | Pervan | E04C 2/30 |
| | | | 428/172 |
| 2011/0091735 A1* | 4/2011 | Luc | B32B 7/14 |
| | | | 428/535 |
| 2011/0219930 A1* | 9/2011 | Bailey | B27F 1/04 |
| | | | 83/677 |
| 2011/0268916 A1* | 11/2011 | Pardue, Jr. | B32B 5/245 |
| | | | 428/116 |
| 2013/0318911 A1* | 12/2013 | Sealock | E04C 2/00 |
| | | | 52/747.1 |
| 2014/0186610 A1* | 7/2014 | Pervan | B32B 38/08 |
| | | | 428/292.4 |
| 2014/0199558 A1* | 7/2014 | Pervan | E04C 2/246 |
| | | | 428/530 |
| 2014/0370319 A1 | 12/2014 | Vetter et al. | |
| 2015/0111055 A1* | 4/2015 | Persson | B32B 21/02 |
| | | | 428/537.5 |
| 2016/0214395 A1* | 7/2016 | Torfs | C09D 11/38 |
| 2016/0325558 A1* | 11/2016 | Strijckers | B41J 2/01 |

FOREIGN PATENT DOCUMENTS

| | | |
|---|---|---|
| DE | 202013104779 U1 | 11/2013 |
| EP | 1607537 A2 | 12/2005 |
| EP | 2246500 A2 | 11/2010 |
| EP | 3109370 A1 | 12/2016 |
| WO | 0053860 A1 | 9/2000 |
| WO | 2006066776 A2 | 6/2006 |
| WO | 2013026172 A1 | 2/2013 |
| WO | WO 20130318911 | * 12/2013 |

OTHER PUBLICATIONS

SINTEF, Fibo Trespo Bathroom panel, Technical Approval, Sep. 2000, pp. 1-3, No. 2289, SINTEF Building and Infrastructure.

* cited by examiner

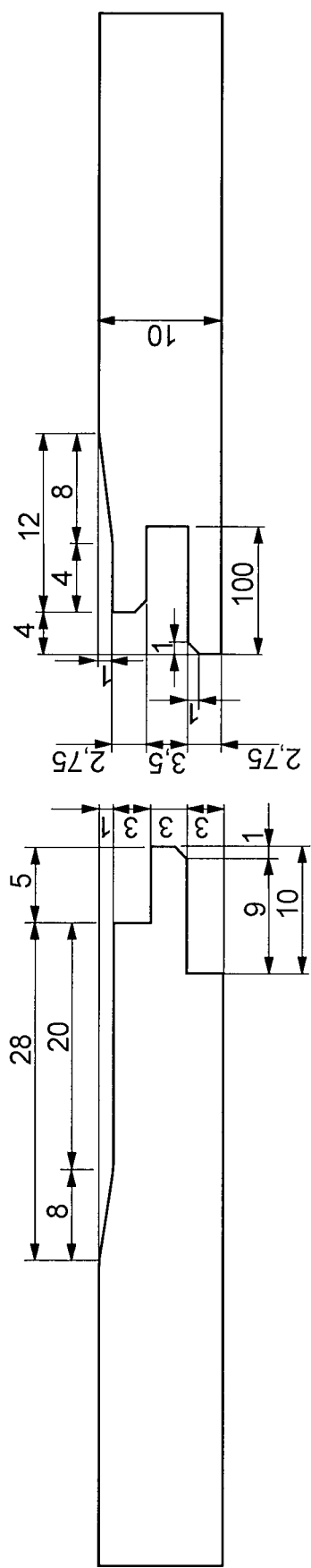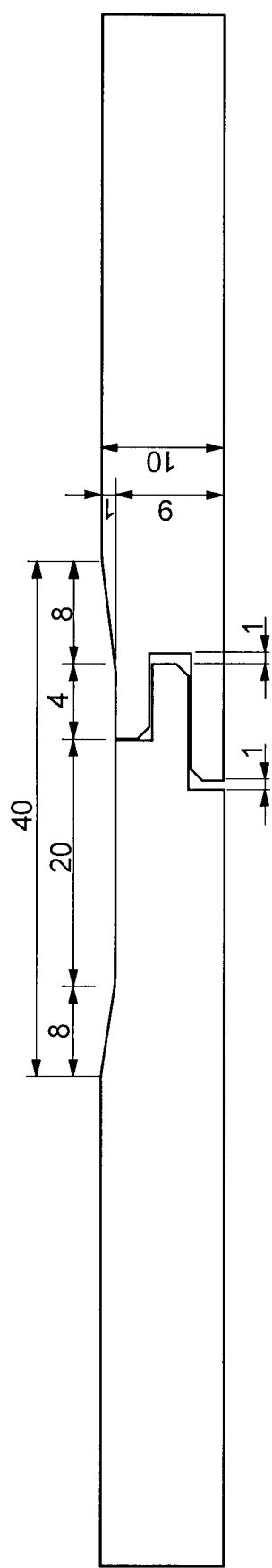
FIG 1D
FIG 1E

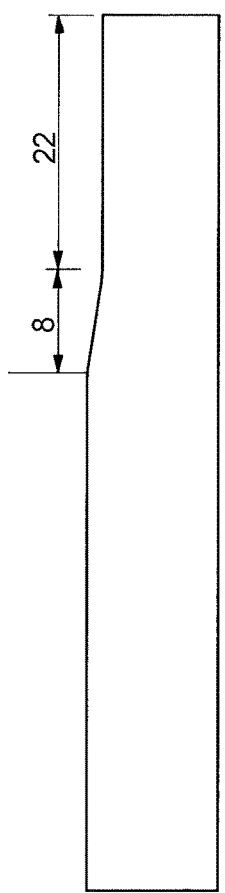
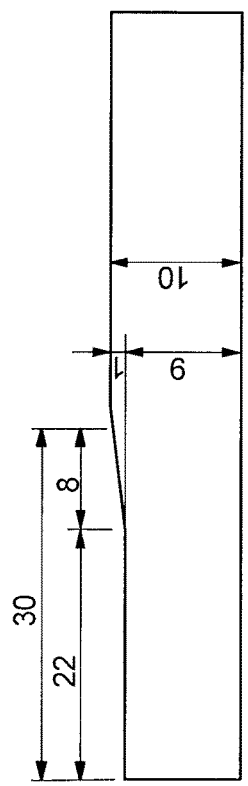
FIG 1L
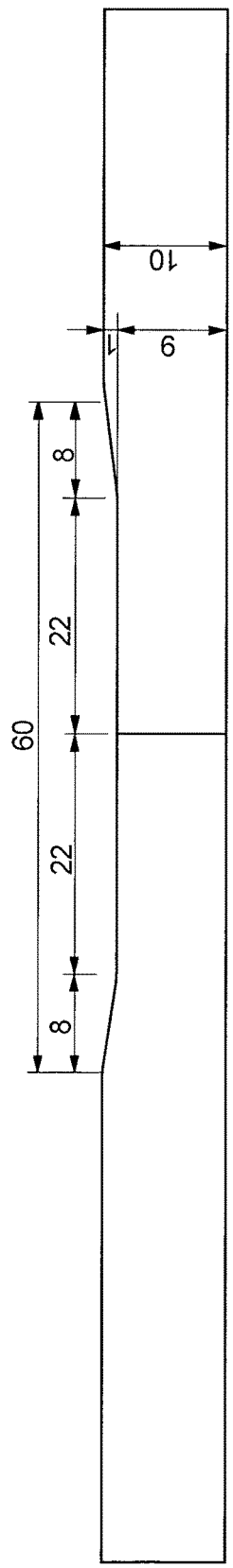
FIG 1M

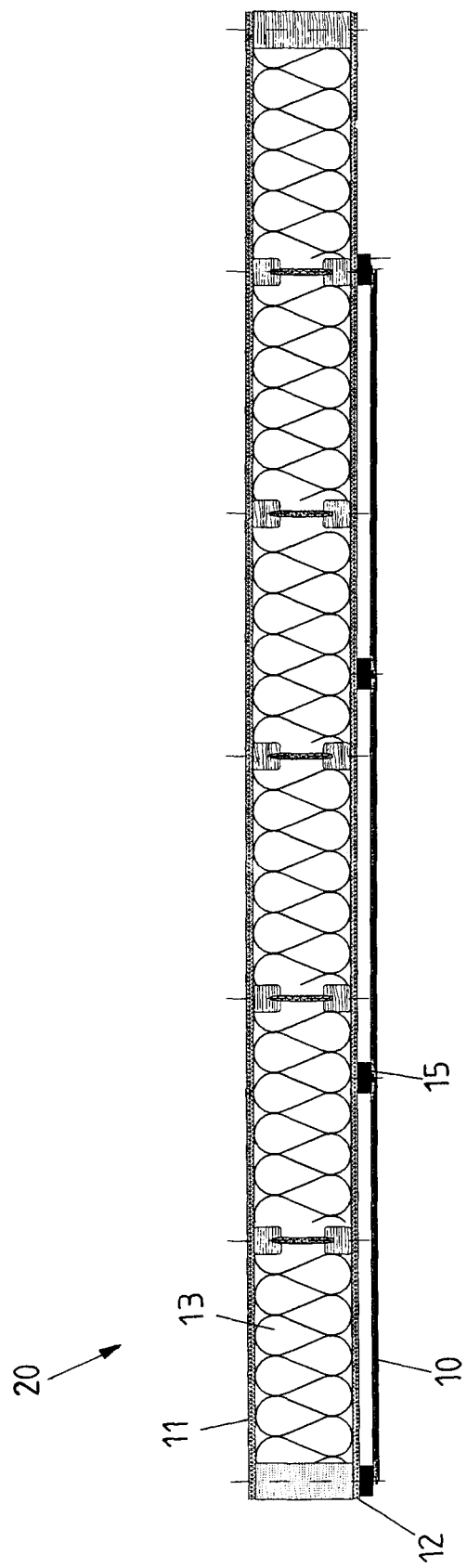

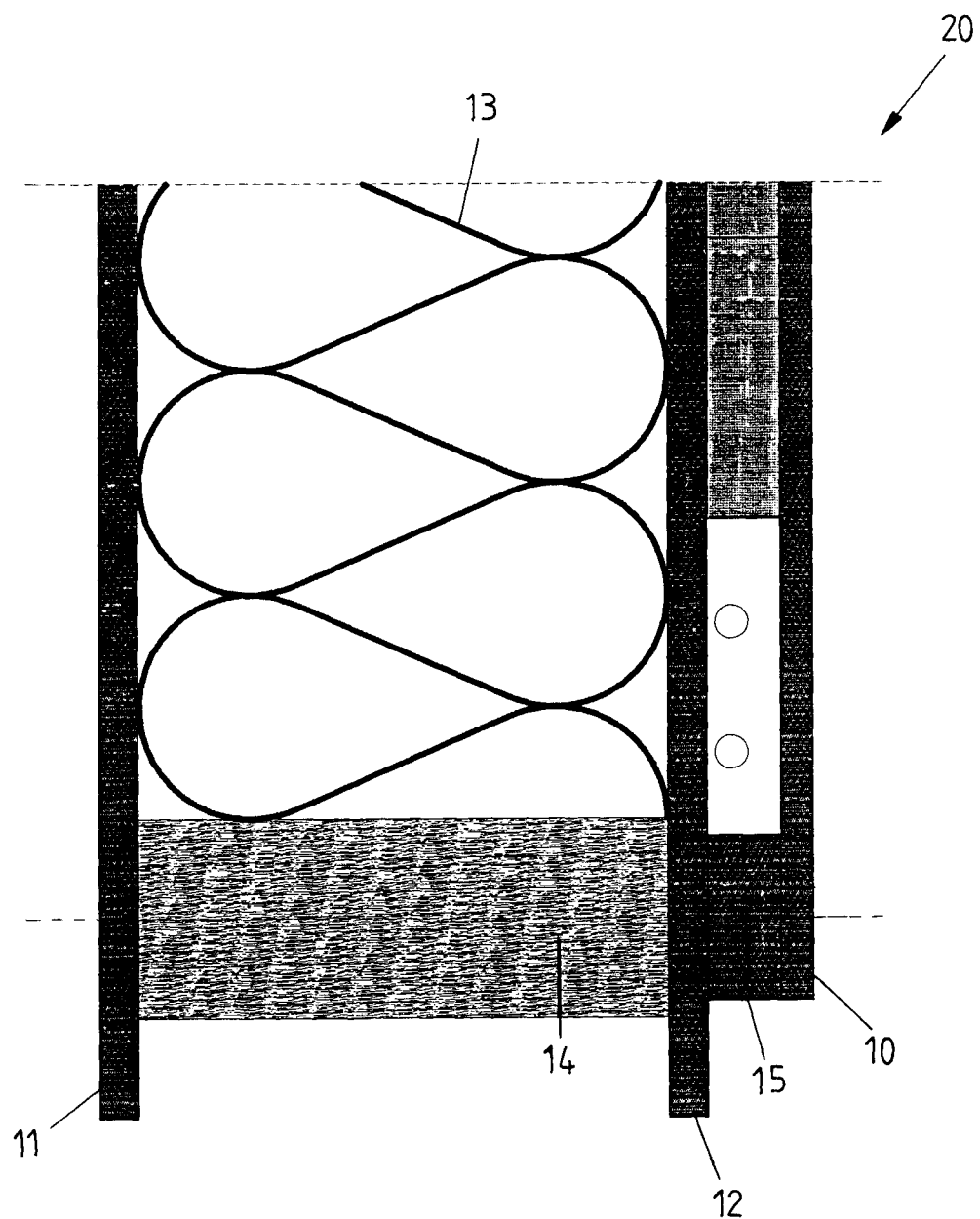

FIG 2C
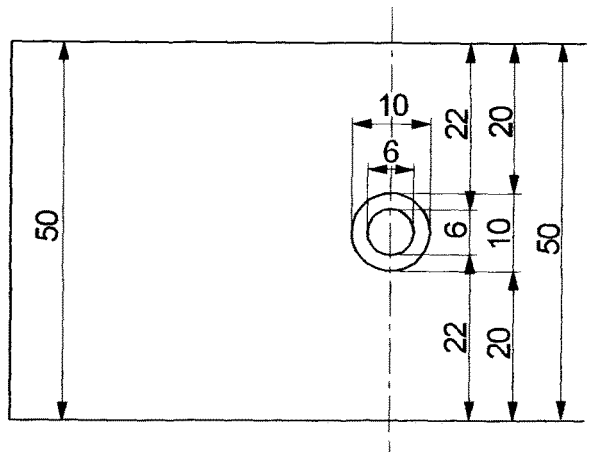
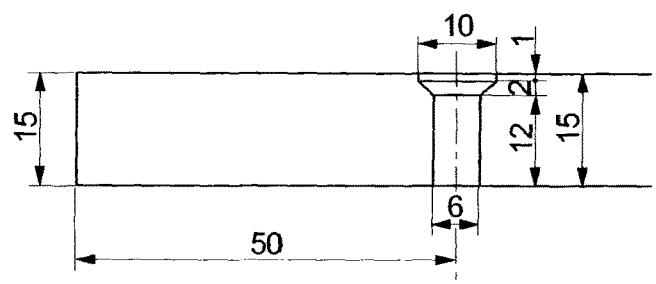
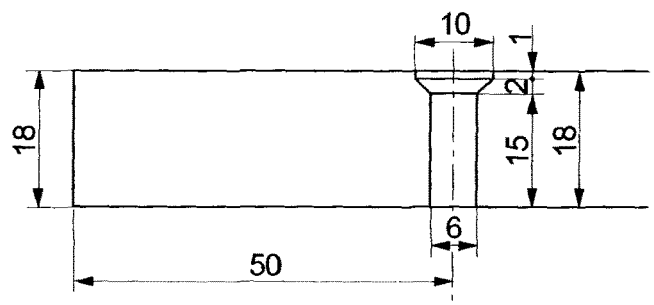
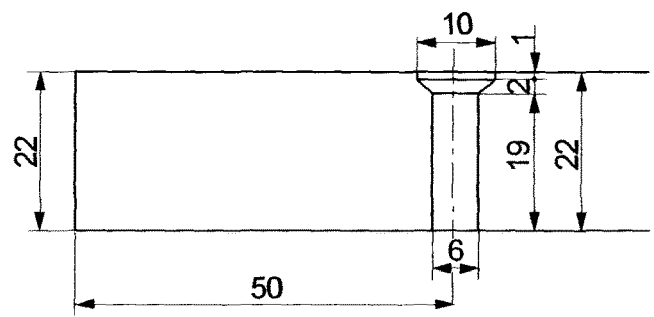

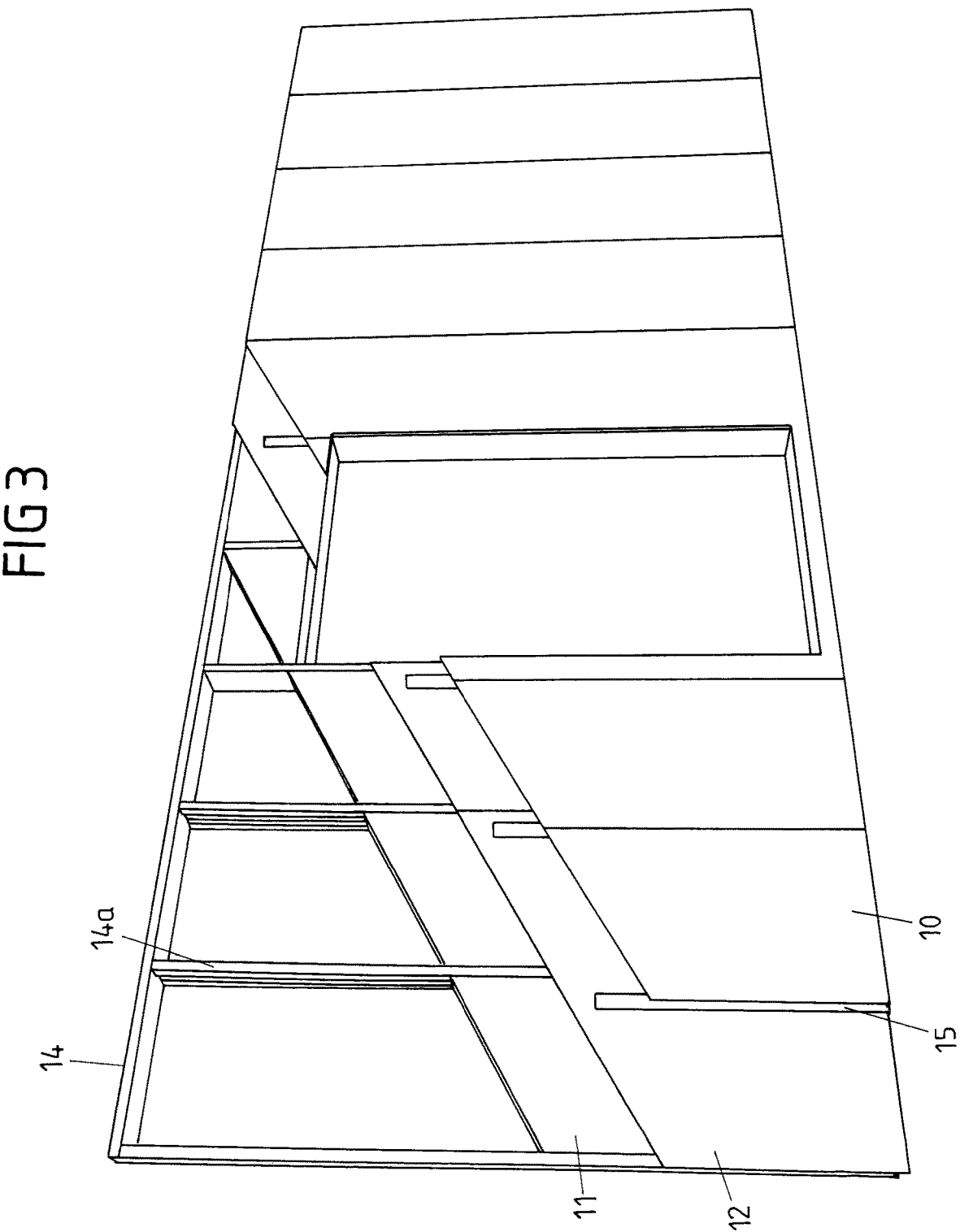

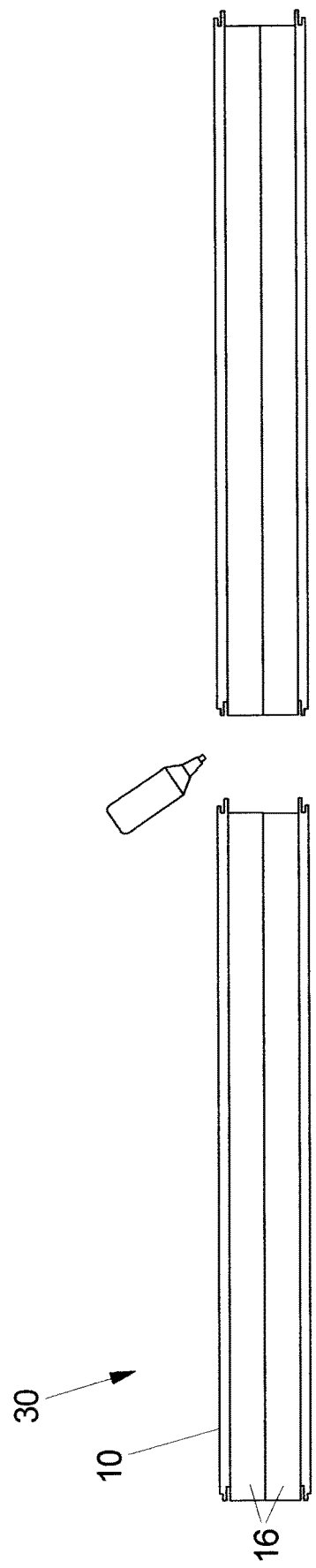

MODIFIED OSB BOARD AND ITS USE IN WALLS FOR HOUSE BUILDING SYSTEMS

CROSS-REFERENCE TO RELATED APPLICATIONS

This application is the United States national phase of International Application No. PCT/EP2016/063326 filed Jun. 10, 2016, and claims priority to European Patent Application Nos. 15173828.3 and 15189959.8, filed Jun. 25, 2015, and Oct. 15, 2015, respectively, the disclosures of which are hereby incorporated in their entirety by reference.

BACKGROUND OF THE INVENTION

Field of the Invention

The present invention relates to a modified OSB board, a construction wall for a house building system, a partition wall for a house building system, and a house building system.

Description of Related Art

OSB boards (oriented strand boards) are wood-based boards which are obtained from strands. The OSB boards are more and more used in wood and prefabricated house building since OSB boards are of a light weight but still fulfil the static requirements of construction boards or panels. Thus, OSB boards are used as construction panels and as wall or roof plating or also as flooring panels.

The production of OSB boards is carried out in a multiple stage process, wherein at first the strands are cut from debarked woods, preferably soft woods, in longitudinal direction by rotation blades. In the subsequent drying process the natural humidity of the strands is reduced at high temperatures. The degree of humidity of the strands can vary depending on the adhesive used. Following the drying process the strands are feed into a gluing apparatus, in which the glue or is applied to the strands. PMDI (Polymeric Diphenylmethanediisocyanate) or MUPF resin (Melamine Urea Phenol Formaldehyde) are mainly used as adhesives. Subsequently, the glued strands are spread alternating lengthwise and crosswise to the production direction such that the strands are arranged crosswise in at least three layers (lower layer, middle layer, upper layer). This is followed by a continuous pressing of the strands at high pressure and high temperature.

As mentioned, OSB boards can be used as construction panels in particular in the prefabricated house construction. For instance, when OSB boards are used for wall construction, the wall is made of a solid wood frame filled with appropriate beams (in particular i-beams) and covered from both sides with the OSB boards. The space between the frame elements is isolated.

Typically, the side of the construction wall pointing to the inner side of the house or building is covered with plaster boards or gypsum fiber panels. When using plaster boards, a large number of accessories, like screws, reinforcing mashes and a large amount of plaster mix is required, which has to be applied in layers over a large area at the junction of the plaster board panels. In addition, the spots or spaces, where screws are driven into the plaster board panel need to be filled. Furthermore, after application of each layer one has to wait until the plaster is dried, then the surface has to be abraded before the next layer is applied. These operations generate large amounts of gypsum dust and lengthen the time for the installation of the finishing trims. The structure of plaster board panels is also soft and is not suitable for hanging up heavier decorations such as large paintings. Thus, in order to hang up decorations on such a plaster board panel the construction has to be strengthened or special mounting dowels need to be used.

Besides that gypsum fiber boards are typically very heavy (density of about 1200 kg/m$^3$) and require a lot of effort and knowledge on the part of the person fitting them. For installation purposes special accessories which are only used for gypsum boards, like Fermacell gypsum board are used. The surface requires the application of a gypsum coat over the entire area. For cutting and machining operations special tools are required.

Thus, there is a need for an alternative to gypsum boards for the interior finishing in house building systems using OSB boards, which can be easily applied to the construction wall and which overcomes the disadvantages of the presently used gypsum boards.

SUMMARY OF THE INVENTION

An object of the present invention is thus to overcome the disadvantages of the presently used gypsum boards. This object is being solved by a modified OSB board as described herein.

Accordingly, a modified OSB board with an upper and a lower side is provided, whereby the upper and/or lower side of the OSB board are coated with at least one paper layer, preferably at least two paper layers. It is particularly preferred if the upper and lower side are each coated with at least two paper layers.

Such a modified OSB board can be used as an alternative to the gypsum boards. The physical and mechanical properties of the modified OSB board allow an installation of heavy elements of interior finishing without special dowels.

The modified OSB boards can be linked together in an easy manner using a specific plate connection system (a tongue and groove joint system) which allows for hiding the screw heads.

The additional use of adhesives, such as polyurethane adhesives ensures a strong and durable bonding of the modified OSB boards. Said connection system does not require the use of large amounts of gypsum only one layer is sufficient to fill the connections.

The outer layer of the modified OSB board can be used without further priming for painting or wallpapering. Altogether, fewer steps are required for installing the modified OSB board and thus time and investment costs are reduced. Another advantage is to apply plaster to coat the modified OSB board with acrylic paints or to stick wallpapers to the modified OSB board. Specially designed finishing with tongue and groove allows the installation of the panels without any efforts even by persons with no professional skills.

In an embodiment of the present invention the modified OSB board has a thickness in the range between 5 to 50 mm, preferably between 7 and 30 mm, in particular preferably between 9 and 22 mm.

In another variant of the present modified OSB board the one first paper layer, in particular the paper layer being adjacent to the board surface (i.e. the first paper layer is arranged directly on the OSB board surface) is impregnated with at least one resin, in particular at least one formaldehyde resin. The formaldehyde resin used for impregnation of the first paper layer is selected from a group comprising melamine formaldehyde resin, urea formaldehyde resin and melamine urea formaldehyde resin or maleic resins or urea-maleic-formaldehyde resin.

The first paper layer consists of a paper with a weight in the range between 30 and 200 g/m$^2$, preferably between 50 and 150 g/m$^2$, in particular preferably between 80 and 120 g/m$^2$.

In another variant the second paper layer, in particular the paper layer arranged on the first paper layer, consists of a raw paper. The weight of the raw paper used for the second paper layer is in a range between 30 and 300 g/m$^2$, preferably between 50 and 250 g/m$^2$, in particular preferably between 100 and 120 g/m$^2$. When arranging a raw paper as outer layer on an OSB board a suitable substrate is obtained which allows a direct application of gypsum, putty and wallpaper glue.

The preferred layer arrangement in the modified board is raw paper-impregnated paper-OSB board-impregnated paper-raw paper.

It is also possible to apply hydrophobic compounds onto the second paper layer, which forms preferably the upper outmost layer, for protection against external climate conditions.

It is furthermore possible that the paper layers, and here, again, in particular the second outermost paper layer, is pressed with a layer of a metal film such an aluminum film for heat reflection.

The modified OSB board is obtained in a process wherein in a first step the surface of a non-modified OSB board is surface treated, for instance sanded, and the paper layer(s) is (are) applied to the upper and/or lower side of the board, preferably simultaneously, and laminated.

The present modified OSB boards can be provided in form of panels with sharp and/or straight edges or as panels with a tongue-and-groove joint. The use of a tongue-and-groove joint for each OSB board is however preferred. The tongue-and-groove joint mechanism provides a connection system for connecting the modified OSB boards. When connecting to modified OSB boards having each a tongue-and-groove joint the OSB boards are connected in the way that the tongue of one board is pushed into the groove of the other board. Furthermore, a fastening means, such as a screw or staple can be inserted into the bottom of the groove. The head of the fastening means, such as the head of the screw is then covered by inserting the tongue of the other board. The tongue and groove joint is finally glued with an appropriate adhesive, such as a polyurethane adhesive. Such tongue-and-groove joints are known and are used in different systems, such as for connecting bathroom panels (used for example by manufacturer such as Fibo-Trespo, SE).

In another embodiment of the present modified OSB boards the panels comprise chamfers or bevels near the lateral or abutting edges. In particular, a modified OSB board comprises at least one chamfer, preferably two chamfers on one side of the OSB board each located at the abutting edges (or hems) of the OSB boards. After connecting two OSB boards comprising such chamfers (for example using the tongue-and-groove joints) a depression or deepening is formed extending over the abutting edges of the two OSB boards joined together. Said depressions or deepenings formed over the joints may have a length between 30 and 70 mm, preferably between 40 and 60 mm and a depth between 0.5 and 2 mm, preferably 1 mm. Said depressions may be used for receiving a putty or filler for covering screws or for placing a fiberglass mesh reinforcement.

In a yet another embodiment of the present modified OSB boards the boards or panels comprise further depressions or deepenings at different positions along the OSB board on at least one side of the board. It is preferred that the depressions are provided on the side of the modified OSB board that—when arranged as part of the construction wall as described below—face the interior of a housing to be built.

It is furthermore preferred that the dimension of such a depression is adapted to the dimension of laths that are provided between a non-modified OSB board and a modified OSB board for providing an installation space between said boards as part of a construction wall. For example, such a depression may have a length between 10 and 30 mm, preferably between 15 and 25 mm and a width that corresponds to the width of the OSB board. Said depressions may also have a chamfer or slant or inclination.

Furthermore, the pattern of the depressions and the distance between the depressions along the OSB board may match the lath grate providing the installation space. For example the distance between two depressions may be 500 to 800 mm, preferably between 600 and 700 mm, in particular preferably about 680 mm.

The depressions allow an exact positioning of the modified OSB boards on the lath grate and fastening (for example by using appropriate screws) on the lath grate. Within the depressions the fastening means (such as a screw) are arranged that can be covered by putty or primer mass.

The modified OSB boards comprising depressions as described are preferably obtained by pressing OSB board and paper layers using appropriate press plate adapted appropriately to such an OSB surface structure comprising depressions.

The present modified OSB board is based on wood strands with a length between 50 to 200 mm, preferably 70 to 180 mm, in particular preferably 90 to 150 mm and a width between 5 to 50 mm, preferably 10 to 30 mm, in particular preferably 15 to 20 mm and a thickness between 0.1 and 2 mm, preferably between 0.3 and 1.5 mm, in particular preferably between 0.4 and 1 mm.

The adhesives used for producing the OSB boards are preferably PMDI or MUPF resins.

An object of the present invention is also solved by a construction wall for a house building system as described herein. Such a construction wall comprises at least one modified OSB board as described previously.

In an embodiment, the construction wall comprises
at least one wood frame with two long sides and two short sides continuing in each case parallel to each other, wherein the area delimited by the frame is divided into at least two, preferably multiple subareas using at least one beam, preferably multiple beams extending within the frame vertical from one long side to the other long side of the frame parallel to the short sides of the frame;
wherein the at least one wood frame is covered on both sides by at least one non modified (i.e. conventional) OSB board (such as OSB/3), respectively; and
wherein at least one modified OSB board as previously described is arranged on at least one of the non-modified OSB Boards.

The wood frame of the present construction wall may be a solid wood frame. The use of solid wood in the structure of the frame, however, does not always meet the requirements of the required construction quality since the beams made of solid wood are often uneven, twisted and have knots. As a result, a lot of expensive waste timber is created which in turn increases the cost and time of the element, such as the construction wall, being built.

As an alternative to the solid wood as material for the frame, the frame is preferably made of a wood based material (OSB power). The wood-like material is characterized by physical and mechanical parameters, which are comparable to solid wood and without the stresses and knots typical for natural wood. Thus, by changing the solid wood in the frame structure to the wood based material the problems associated with the defects of solid wood can be eliminated. The wood based material is based on OSB strands, wherein three layers of the strands are flatly pressed.

The presently used wood based material is preferably produced using the ContiRoll technology. Rectangular strands are rolled at high pressure and high temperature using a synthetic resin as a binding agent. Furthermore, high temperatures used in the production of the wood based material eliminates all living organisms in the wood, such as insects and fungus. The used ContiRoll technology allows the production of any format so that the wall frame can be of any width.

In a further variant of the present construction wall, the space between the at least two non-modified OSB boards (such as OSB/3), i.e. between the frame elements, is filled with an appropriate insulation material, in particular with an insulation material based on wood fiber.

The outer side of the construction wall, i.e. the side of the construction wall facing the outside of the building can be additionally insulated with mineral wool and covered with glue and fiber glass mesh and the surface can then be covered with silicon plaster.

The inner side of the construction wall, i.e. the side of the construction wall facing the interior of the housing to be built, is covered with gypsum board or more preferably with the non-modified OSB board as described above. When using the modified OSB board for covering the inner side of the construction wall the modified OSB board is arranged on a non-modified OSB board by using suitable laths which are mounted vertical on the non-modified OSB board and onto which the modified OSB board is placed whereby a space between the non-modified OSB board and the modified OSB board is provided.

In another variant of the construction wall, the space between the non-modified OSB board and the modified OSB board is used for installing electrical equipment (such as electrical wires) and plumbing means (such as water pipes). The space provides also additional ventilation.

In this manner an installation space or level is provided which allows for placing certain devices and equipment near or at the construction wall without destroying the same, for example there is no need to drill a hole in the construction wall for placing a socket or such therein. In this way the insulating effect of the construction wall remains unaffected.

The laths used for providing said installation space or level may be made of any suitable wooden or also other material such as plastic. However, in a preferred embodiment the laths are made of OSB material, in particular OSB/3 material.

It is furthermore preferred if said laths comprise in each case at least one drilled hole, preferably two or more holes, allowing a quick installation of the said laths. In case of two and more holes, for example four to five hole per lath, there is a defined distance between the holes and also between each hole and the edges of the lath. In one variant the distance between at least two holes may between 200 and 500 mm, preferably 400 mm. The distance of each hole from the longitudinal edge of the lath may be between 20 and 25 mm (in case of a lath width of 500 mm) and the distance from the lateral edge of a first hole on each lath may between 40 and 60 mm, preferably 50 mm. This allows for a fast and simple use of the laths, in particular in case multiple laths are arranged on top of each other for widening the installation level or space.

In an embodiment the laths may have thicknesses between 15 and 22 mm, in particular 15, 18 and 22 mm, and dimensions of 50×2500 mm. Multiple laths may also be attached or arranged one above the other. Thereby it is possible to combine laths, such as three laths, having the same thickness or different thicknesses. In a most preferred embodiment three laths with each having another thickness are combined. For example an OSB lath having a thickness of 22 mm is combined with an OSB lath having a thickness of 18 mm and 15 mm (in this order). The different laths may be screwed or glued together. When using such multilayered laths the space between the boards can be adapted in any suitable manner.

The laths may be used as part of the construction wall as described above and may be integrated into a building system.

They may also be used separately, for example when renovating a house, for creating an additional installation layer or installation space. In this case the laths may be applied to an already existing wall and suitable boards such as the modified OSB boards can be then placed on the lath thereby providing extra space for installation purposes without the need for damaging the original wall.

When mounting the modified OSB board on the non-modified OSB board the modified OSB board is placed on the laths which are spaced from each other typically in a range between 500 to 800 mm, preferably between 600 and 700 mm, in particular preferably about 680 mm. Thus, the laths serve as a grate for assembling (modified) OSB-boards, MDF-boards or other finishing elements.

The tongue-and-groove joint system of the modified OSB boards allow for an easy installation of the modified OSB boards on the construction wall. As previously described, the tongue of one OSB board is pushed into the groove of another OSB board, whereby in the groove a fastening means such as a screw or staple is placed which serve for fastening the OSB board onto the laths. The fastening means is subsequently covered by the tongue of the other second board and the tongue and groove joints are glued with an appropriate adhesive such as polyurethane adhesive. After installation and gluing of the wall elements the joints are coated with a gypsum mix and subsequently with acrylic painting.

An object of the present invention is also solved by a partition wall for a house building system as described herein.

The partition wall for a house building system according to the invention comprises at least one of the modified OSB boards previously described. In a variant, the partition wall comprises an inner core, which in turn comprises at least one, preferably at least two wood fiber boards, such as LDF or boards, whereby the use of LDF boards is mostly preferred.

In a variant of the present partition wall, at least one side, preferably both sides of the inner core are covered by at least one modified OSB board as previously described. It is also possible that the inner core is covered by a conventional OSB board, however, a modified OSB boards of the invention are preferred. The OSB boards used for covering the inner core of the partition walls are profiled again with the tongue-and-groove joint connection system allowing a fast installation of the partition wall in any room.

The present partition wall system allows the division of any room into two or multiple rooms at any point of the construction and also at a later point. The simple mounting system of the tongue-and-groove joints eliminates any cumbersome and time consuming construction of dividing walls or partition walls using brick stone. Using wood fiber panel such as an LDF panel for the inner core element automatically provides a heat and acoustic insulation. Further advantage of the present partition wall is that due to the structure of the wall it is possible to cut out space for doors or windows anywhere. The light elements, quick and well-designed installation create an innovative system for the construction of the partition walls.

An object off the present invention is also solved by a house building system as described herein. Such a house building system comprises at least one, preferably at least four construction walls as described previously and at least one partition wall, preferably multiple partition walls as described previously.

Besides the construction walls and the partition walls the present house building system also comprises a foundation. In one embodiment, the foundation comprises a foundation base and foundation walls. The foundation base is made of steel and solid concrete, wherein the foundation walls are built of concrete blocks and cemented with mortar. The upper part of the foundation wall is further topped with steel and solid concrete with steel anchor and ventilation pipes. A system of ventilation pipes ventilates the area between the ground and the floor construction.

In a second embodiment, the foundation is made in the form of a pile foundation. In this case, round holes are created in the underground (typically natural underground like earth) into which steel and solid concrete with thread anchors is inserted. Between the piles precast concrete walls are mounted.

The floor construction of the present house building system comprises beams, such as I-beams, which are covered by non-modified conventional OSB boards having tongue and groove joint connection system. The upper OSB board has typically a thickness of about 20 to 30 mm, preferably 25 mm and the lower OSB board has a thickness between 10 and 20 mm, preferably 12 mm and 15 mm, most preferably 12 mm. The space between the upper and the lower OSB board is filled with insulation material, in particular with wood fiber insulation material. The upper side of the floor construction (i.e. the upper surface) is provided with a sill plate made of solid wood.

The ceiling construction of the present house building system also comprises beams, such as I-beams, which are again covered by an upper conventional OSB board and a lower conventional OSB board. The upper cover OSB board has typically a thickness of about 20 to 30 mm, preferably 25 mm and the lower cover OSB board has a thickness between 10 and 20 mm, preferably 12 mm and 15 mm, most preferably 12 mm. Here, again, the space between the upper OSB board and the lower OSB board is filled with a suitable insulation material, in particular with a wood fiber insulation material. The surface of the lower side of the ceiling construction (i.e. the side pointing downwards to the insight of the housing) may be covered with a non-modified OSB board as described above using suitable spacers such as patch spacers in order to provide a space for ventilation and space for electrical and plumbing equipment.

The roof construction of the present house building system comprises beams, in particular I-beams, mounted to the main beam of the house construction. The outer roof sheathing is made of a non-modified conventional OSB board or a wood fiber board such as a MDF board having a thickness between 12 and 25 mm, preferably 15 mm. The inner (bottom) sheathing is made of a conventional OSB board having a thickness between 10 and 20 mm, preferably 12 mm.

Again, the space between the outer and the inner sheathing is filled with suitable insulation material such as wood fiber insulation. On the inner (bottom) sheathing facing the interior of the house, a modified OSB board as described previously can be mounted, whereby suitable spacers are used between the inner sheathing and the modified OSB board for providing space for electrical equipment or plumbing. Tiles roof bottom and roof lath are furthermore arranged on the outer roof sheathing.

BRIEF DESCRIPTION OF THE DRAWINGS

The present invention is further explained in more detail by means of the following examples with reference to the following Figures. It shows:

FIG. 1D a schematic sight view of a modified OSB board according to a fourth embodiment of the invention;

FIG. 1E a schematic sight view of a modified OSB board according to a fifth embodiment of the invention;

FIG. 1L a schematic sight view of a modified OSB board according to a twelfth embodiment of the invention;

FIG. 1M a schematic sight view of a modified OSB board according to a thirteenth embodiment of the invention;

FIG. 2A a schematic cross view of a construction wall according to a first embodiment;

FIG. 2B a detailed view of a section of a construction wall according to a further embodiment;

FIG. 2C a schematic cross view of laths for use in a construction wall;

FIG. 3 a side view of a construction wall according to another embodiment of the invention, FIG. 4 a schematic side view of a partition wall according to an embodiment according to the invention;

DESCRIPTION OF THE INVENTION

Modified OSB Board

Figure 1A:
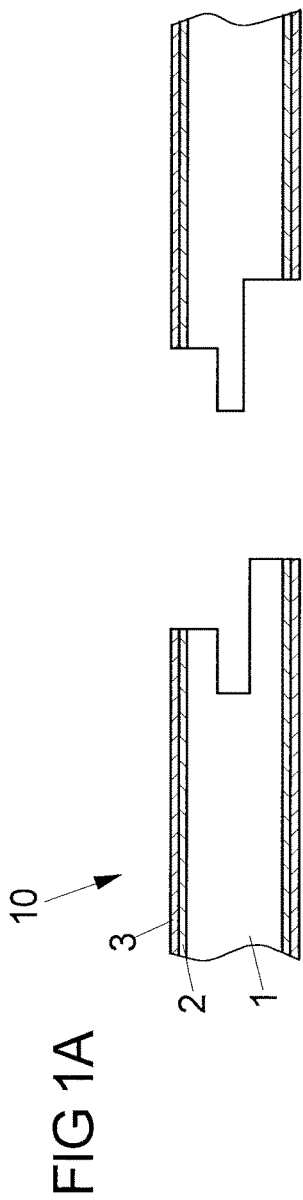
FIG. 1A a schematic sight view of a modified OSB board according to a first embodiment of the invention.

FIG. 1A shows a modified OSB board 10 according to the invention, which is made on the basis of conventional OSB boards with a thickness of 9 mm to 22 mm. The conventional OSB panel 1 is coated on each side with two layers of paper. The first layer 2 consists of paper having the basis weight ranging from 50 $g/m^2$ to 120 $g/m^2$ impregnated with melamine resin, urea resin or melamine urea resin. The outer layer 3 is a raw paper having the basic weight ranging from 50 g/m² to 220 g/m². The panel or board is pressed on the tray press in short cycle or alternatively on the ContiRoll press.

Due to the outer layer 3 comprising raw paper a suitable substrate for direct application of gypsum, patty and wall paper glue is obtained. Onto the outer layer of the raw paper hydrophobic agents can be applied in order to harden the panel against external weather conditions. It is also possible to press the paper together with the layer of an aluminum film in order to obtain a good heat reflection effect.

These OSB boards are widely used in construction of low energy houses or in assembling floor heating. The modified OSB boards are produced either with sharp edges with dimensions of 1250×2800 mm or with tongue-and-groove joints in dimensions of 620×2600 mm.

Figure 1B:
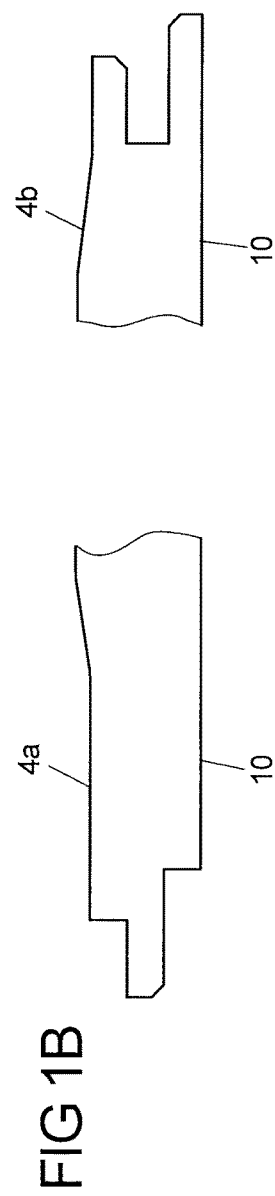
FIG. 1B a schematic sight view of a modified OSB board according to a second embodiment of the invention.

In another second embodiment of the present modified OSB boards shown in FIG. 1B the board 10 has chamfers 4a, b or bevels near the lateral or abutting edges of the board. The dimension of each chamfer 4a,b differs and is adapted to the tongue-and-groove joints. Thus, a chamfer 4a at the tongue edge of the modified OSB board may have a length of about 28-33 mm while a chamfer 4b at the groove edged of the modified OSB board may have a length of about 10-12 mm. The chamfer height is about 1 mm. When connecting two modified OSB boards provided with said chamfers 4a,b using the tongue-and-groove joints a depression or deepening is formed extending over the abutting edges of the two OSB boards joined together. Said depressions are used for receiving a putty or filler and provide more space for covering screws or optionally a fiberglass mesh reinforcement with a plaster board. In order to obtain said depressions a cut was made on the edges and middle part of the board.

Cutting length is 60 mm or 40 mmm to a depth of 1 mm (see also embodiments of FIGS. 1d-n). After cutting, four layers of paper are applied onto the board and compressed by a specially shaped die. The boards can be finished with a straight edge for a butt joint or with a tongue-and-groove edge. Through the modification of the system of cavities a smoother surface is obtained after plastering the joints. In this modification, a new format of the 1200×2800 mm wall board was also introduced to match popular 800×2800 mm plasterboards and ceiling boards.

Figure 1C:
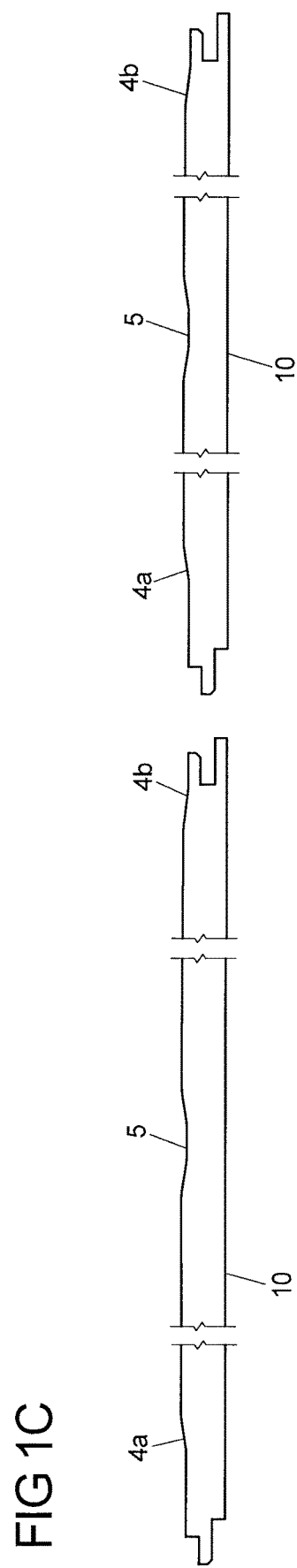
FIG. 1C a schematic sight view of a modified OSB board according to a third embodiment of the invention.

In a third embodiment of the present modified OSB boards shown in FIG. 1C the boards or panels comprise further depressions 5 at different positions along the OSB board on at least one side of the board. The distance between two depressions 5 is about 680 mm and corresponds thus to the distance between the laths of the lath grate to which the modified OSB board is fastened. The length of such a depression 5 is about 25 mm and the depth is about 1 mm. The depressions 5 allow an exact positioning of the modified OSB boards on the lath grate and fastening (for example by using appropriate screws) on the lath grate. Within the depressions 5 the fastening means (such as a screw) are arranged that can be covered by putty or primer mass.

The embodiments shown in FIGS. 1D-M illustrate different dimensions of the joints between two OSB-boards.

The embodiment of FIG. 1D shows a tongue-and-groove-joint wherein the depression on the groove side is 12 mm and on the tongue side is 28 mm, respectively. After connecting both OSB boards a deepening with a total length (or width) of 40 mm is obtained over the joint (FIG. 1E).

Figure 1F:
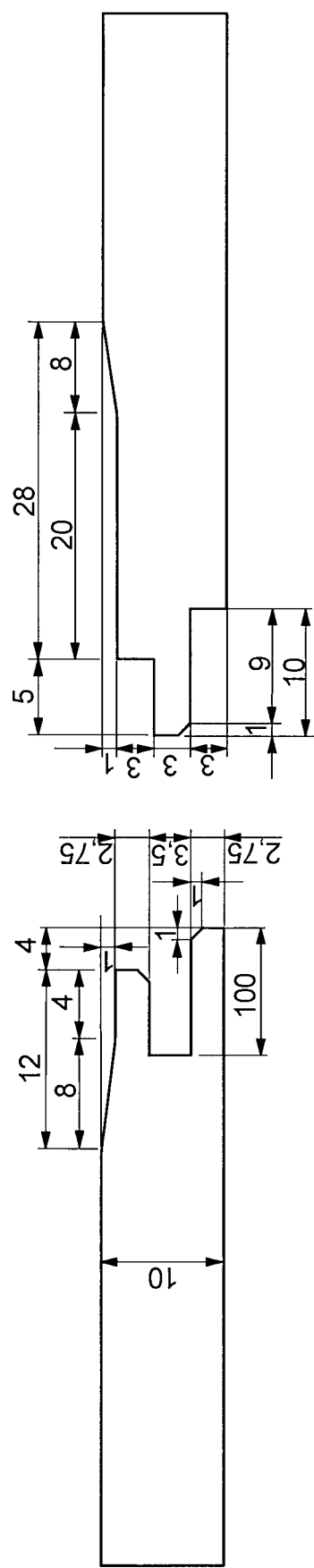
FIG. 1F a schematic sight view of a modified OSB board according to a sixth embodiment of the invention.
Figure 1G:
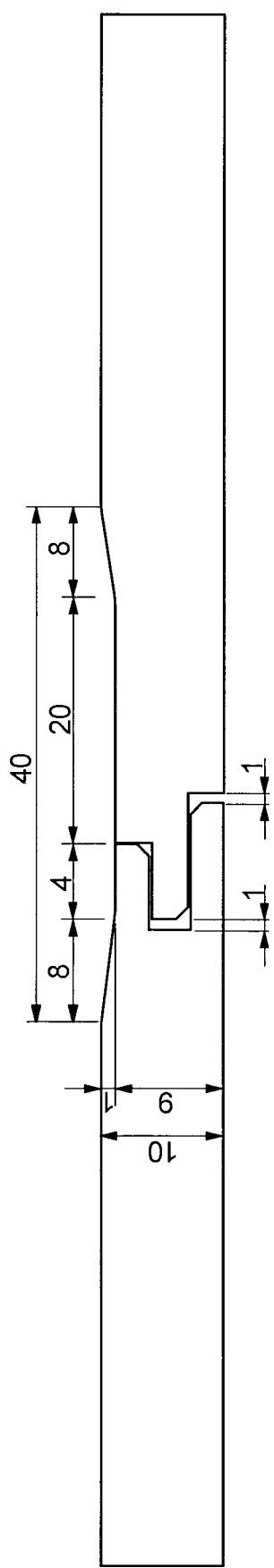
FIG. 1G a schematic sight view of a modified OSB board according to a seventh embodiment of the invention.

The embodiment of FIG. 1F shows a tongue-and-groove-joint wherein the depression on the groove side is 28 mm and on the tongue side is 12 mm, respectively (i.e. reversed to the embodiment of FIG. 1D). After connecting both OSB boards a deepening with a total length (or width) of 40 mm is obtained over the joint (FIG. 1G).

Figure 1H:
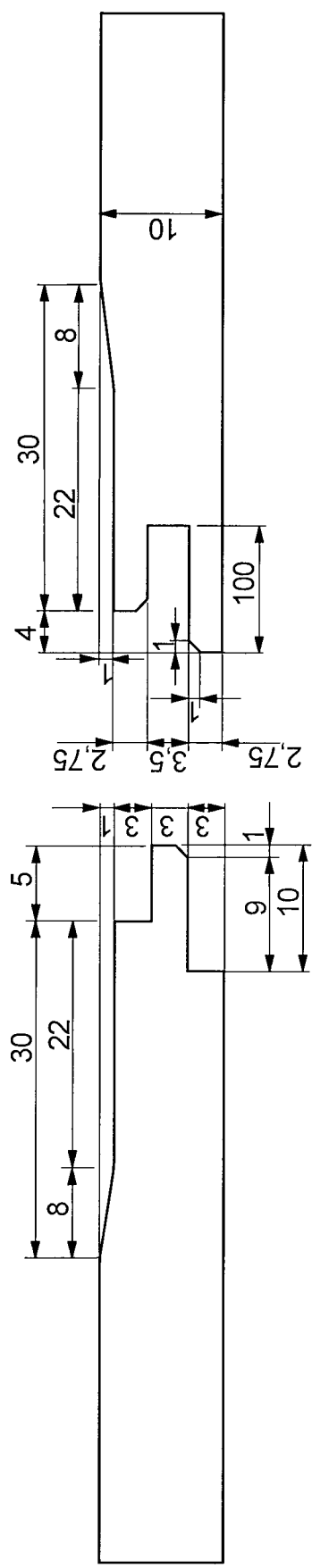
FIG. 1H a schematic sight view of a modified OSB board according to an eighth embodiment of the invention.
Figure 1I:
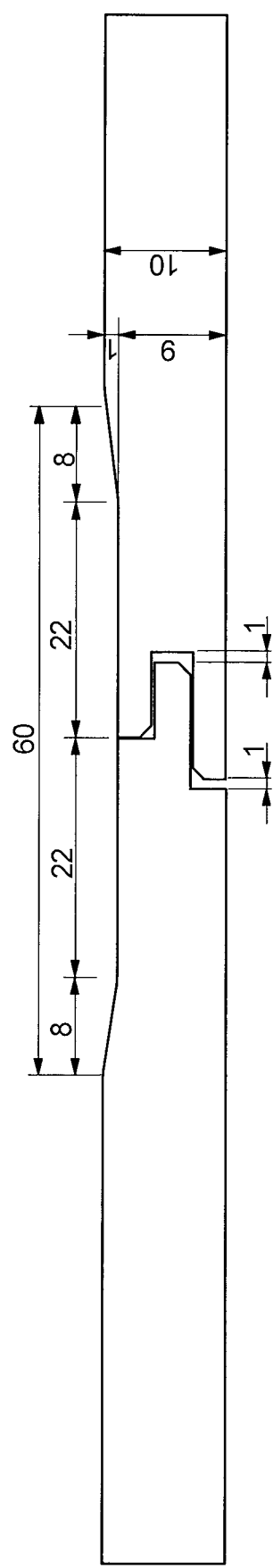
FIG. 1I a schematic sight view of a modified OSB board according to a ninth embodiment of the invention.

The embodiment of FIG. 1H shows a tongue-and-groove-joint wherein the depression on the groove side is 30 mm and on the tongue side is 30 mm, respectively. After connecting both OSB board a deepening with a total length (or width) of 60 mm is obtained over the joint (FIG. 1I).

Figure 1J:
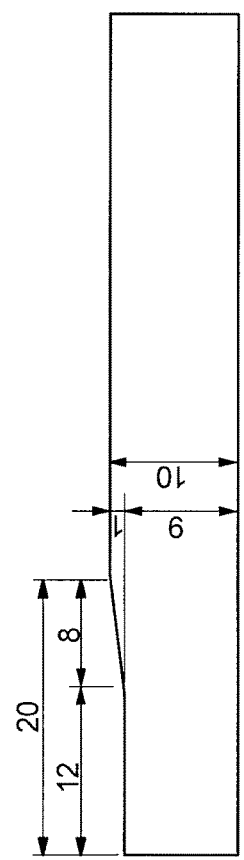
FIG. 1J a schematic sight view of a modified OSB board according to a tenth embodiment of the invention.
Figure 1K:
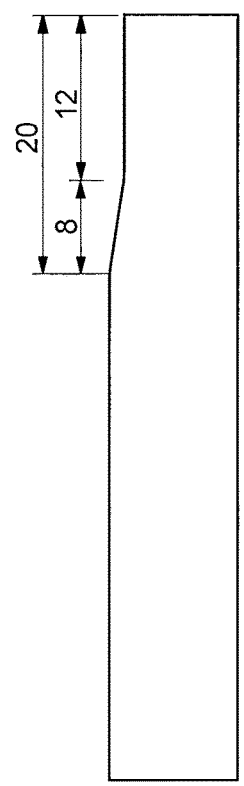
FIG. 1K a schematic sight view of a modified OSB board according to an eleventh embodiment of the invention.

The embodiment of FIGS. 1J, K show a blunt joint. Here two blunt OSB boards with depressions on both sides with a length (or width) of 20 mm, respectively, are connected to each other thereby forming a deepening with a total length (or width) of 40 mm.

The embodiment of FIGS. 1L, M show another blunt joint. Here two blunt OSB boards with depressions on both sides with a length (or width) of 30 mm, respectively, are connected to each other thereby forming a deepening with a total length (or width) of 60 mm.

Construction Walls

The modified OSB board is used to cover a conventional construction wall 20. The construction wall system of the present invention (shown in FIGS. 2A, 2B, 3) is made of one wood frame 14, which is covered on both sides with non-modified OSB-boards (OSB/3) 11, 12. The modified OSB board 10 is placed on the OSB board 12 facing the interior of the building. The space between the OSB boards 11, 12 is filled with a wood fiber insulation material 13.

The wood frame 14 has two long sides and two short sides continuing in each case parallel to each other is provided, wherein the area delimited by the frame is divided in multiple sub-areas using multiple beams 14a extending within the frame 14 vertical from one long side to the other long side of the frame parallel to the short sides of the frame.

The construction wall 20 contains cut-through laths 15 having dimensions of 50 mm×2600 mm and a thickness ranging from 18 mm to 22 mm with drilled, chamfered holes which are ready for quick installation (see FIG. 2C).

Laths 15 are made of OSB-material (OSB/3). The laths 15 (see FIG. 2C) are 15, 18 or 22 mm thick wherein each single lath comprises a hole allowing a ready use of the laths. The hole is arranged with a distance of 50 mm from the lateral edge of the lath and about 25 mm (the hole center) from the longitudinal edge (in case of a 50 mm wide lath). Each lath may comprise multiple holes. In such a case the distance between each hole is about 400 mm (not shown).

The single laths may be combined together to form one singular lath of different thicknesses allowing for an adaptation of the space created between the boards of the construction wall.

Laths 15 are mounted vertically on the wall to obtain ventilation of the build-up area and furthermore space for routing electrical wires or water piping. Depending on the diameter of the plumbing pipes one or two laths 15 are used. The spacing of a lath 15 is selected in order to ensure the tongue and groove joint being in the axis of a in the case of a OSB board or panel is used with a tongue and groove joint. The distance between the laths 15 in the axis is 680 mm. After the laths 15 are installed on the wall the installation of the modified OSB panels 10 begins. The installation starts at the corner of the wall by screwing the modified OSB board 10 to a lath 15 and drive in the screws on the other side in the bottom of the groove. When putting the tongue of the next board 10 the head of the screw are staple is covered. The tongue and groove joint is subsequently glued with polyurethane adhesive. Following the installation and the gluing of all wall elements a gypsum mix is applied to the joints. After the gypsum has dried the joints are abraded and coated with acrylic paint.

Due to the installation of the modified OSB boards 10 the interior finishing is faster and easier. Furthermore, due to the use of the present tongue and groove joints the heads of the screws or staples are hidden, the consumption of gypsum mix is reduced what in turn optimized the interior finishing process. Smaller panel formats reduce the weight which is important for work ergonomics.

Partition Walls

The partition walls 30 (shown in FIG. 4) are made from modified OSB boards 10 or conventional OSB boards (OSB/3 panels) having a thickness of 9 mm. The interior of the wall, i.e. its core consists of two LDF panels 16 with a density of 280 kg/m$^3$. The individual layers are glued together using a polyurethane adhesive.

The wall 30 has a profile tongue and groove joint which is used for quick installation of the partition wall in any room. The wall is a light weight construction that does not transfer the structural loads of the building.

For wall installation at first the position of the partition wall 30 on the ceiling and floor is marked. Subsequently, an OSB power panel is installed on the floor and wall. OSB Power Panel parameter properties are obtained by arranging bigger strands and adequately gluing them together.

The installation starts by setting the element on the floor panel, then slide the element with its groove to the OSB power panel mounted to the wall. A polyurethane adhesive is applied to all joints. A metal element connecting the wall with the ceiling is installed on the upper edge of the tongue. In a similar manner the next wall element is mounted to fill the entire surface. The space between the wall and the ceiling and the end wall is filled with a polyurethane foam. All joints are finally filled with a coat of gypsum, which is reinforced with fiber glass and the surface is covered with acrylic paint or wall paper.

House Building System (40)

Figure 5:
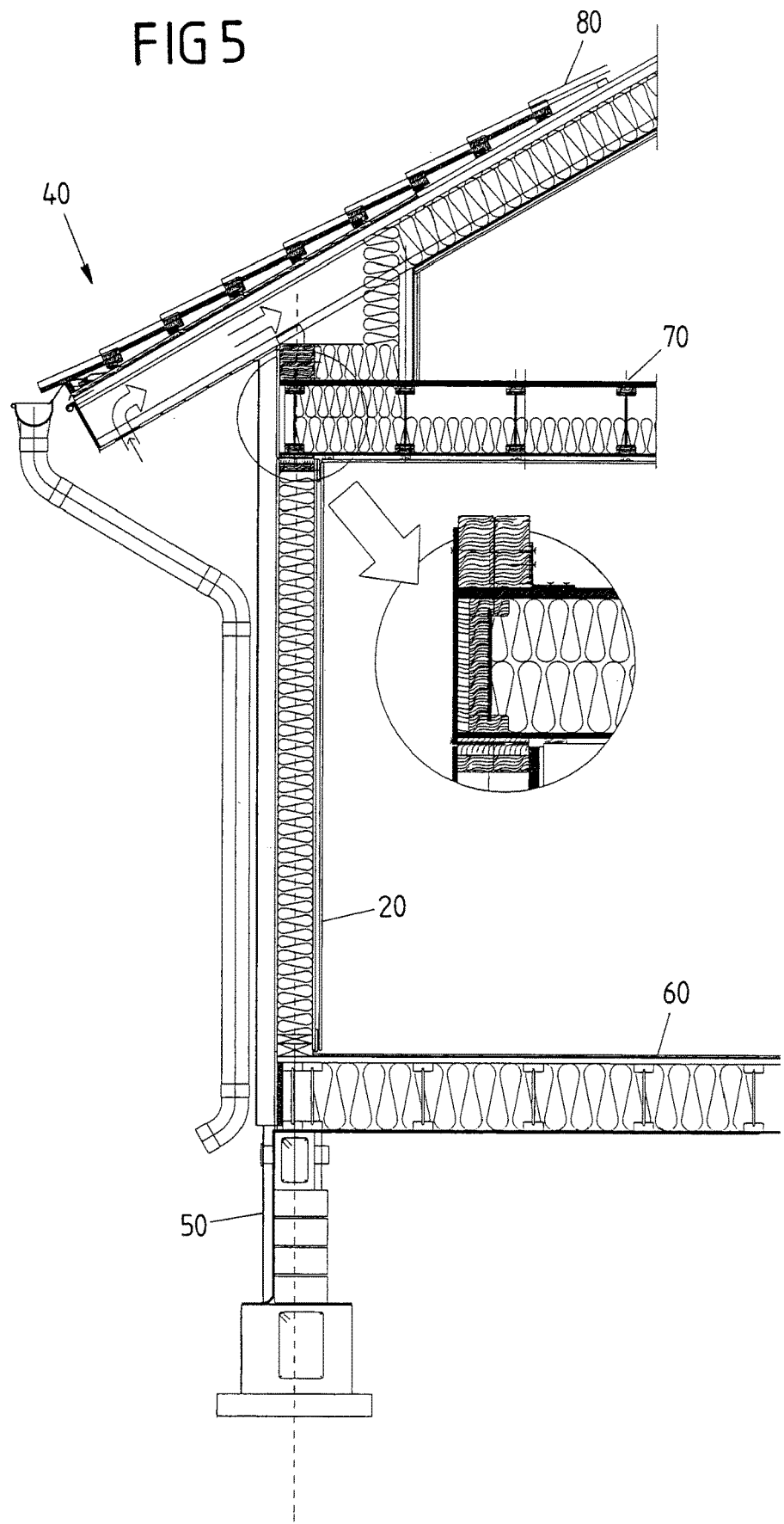
FIG. 5 a schematic side view of a house building system according to an embodiment of the invention.

FIG. 5 shows a schematic side view of a house building system 40 with a construction wall 20 and partition walls 30 (not shown).

The house system 40 comprises further a foundation 50, a floor 60, a ceiling 70 and a roof system 80.

Foundation (50)

In a first embodiment, the foundation base is made of steel and solid concrete. The foundation walls are built of concrete blocks and are cemented with mortar. The upper part of the foundation wall is topped with steel and solid concrete comprising steel anchor and ventilation pipes. The whole system of ventilation pipes ventilates the area between ground and the ceiling.

In a second embodiment, the foundation is made in form of a pile foundation. Due to the light structure of the house it is possible to create appropriately designed pile foundation; the drilling machine makes a round hole below the freezing zone, when the pile is shuttered with a paper form, steel and solid concrete with thread anchors is inserted. Between the piles precast concrete walls are mounted. This pile system is cheaper since it uses less concrete and steel, can be constructed faster, precast concrete elements can be mounted in all weather conditions and it may be built on every kind of ground.

Floor Construction (60)

I-beams are covered by a tongue and groove 25 mm conventional OSB board and from the bottom by a 12 mm conventional OSB board. The whole structure is isolated. On the top floor surface a sill plate made of solid wood (KWH wood) is installed.

First Level Floor Construction (70)

If the first level of the attic of the house is usable, then the ceiling is made of i-beams covered with 25 mm thick conventional OSB boards (OSB/3) from the top and 12 mm thick OSB boards (OSB/3) from the bottom with an insulation inside. From the zero level the ceiling system ready to plaster and paint is mounted.

Roof Construction (80)

The roof construction in the present house building system is made of i-beams mounted to the beam by the Simpson adjustable steel fittings. The outer roof sheaving is made of conventional OSB board (OSB/3) or MDF DP 50 board, and the bottom sheaving is made of a 12 mm thick conventional OSB board (OSB/3). Subsequently, a structure ready to plaster and paint, preferably the modified OSB board 10 according to the invention, is mounted to the board. The space between the rafters is insulated. In case of one-story houses the roof construction is made of precast truss, covered with conventional OSB/3 board. The bottom belt of the truss is used as the ceiling. The space between bottom belts is insulated and the ceiling is finished with a ready to plaster and paint system.

The enlarged view in FIG. 5 illustrates the connection of construction wall and ceiling.

The invention claimed is:

1. A modified OSB board (oriented strand board) comprising an upper side and a lower side, wherein the upper side and/or the lower side of the OSB board are coated with at least two paper layers comprising a first paper layer and a second paper layer,
   wherein a paper layer being adjacent to a board surface as the first paper layer is impregnated with at least one resin,
   wherein the second paper layer is arranged on the first paper layer as a raw paper layer,
   wherein the raw paper layer is not impregnated with resin; and
   wherein the weight of the raw paper is between 100 and 300 g/m$^2$.

2. The OSB board according to claim 1, wherein the upper side and the lower side are each coated with at least two paper layers.

3. The OSB board according to claim 1, wherein the paper layer being adjacent to the board surface as first paper layer is impregnated with at least one formaldehyde resin.

4. The OSB board according to claim 1, wherein the OSB board comprises a tongue-and-groove joint.

5. The OSB board according to claim 1, comprising chamfers and/or deepenings on at least one side of the OSB board.

6. A construction wall for a house building system comprising at least one modified OSB board according to claim 1.

7. The construction wall according to claim 6, wherein
   at least one wood frame with two long sides and two short sides continuing in each case parallel to each other is provided, wherein an area delimited by the frame is divided in at least two sub-areas using at least one beam extending within the frame vertical from one long side to the other long side of the frame parallel to the short sides of the frame;
   wherein the at least one wood frame is covered on both sides by at least one non-modified OSB board, respectively; and
   wherein the at least one modified OSB board is arranged on at least one non-modified OSB board.

8. The construction wall according to claim 7, wherein the at least one wood frame is made of wood like material.

9. The construction wall according to claim 7, wherein a space between the at least two non-modified OSB boards is filled with insulation material.

10. The construction wall according to claim 7, wherein the at least one modified OSB board is arranged on the non-modified OSB board by using laths which are mounted vertically on the at least one non-modified OSB board and onto which the at least one modified OSB board is placed, providing a space between the non-modified OSB board and the at least one modified OSB board.

11. The construction wall according to claim 10, wherein in the space between the non-modified OSB board and the at least one modified OSB board electrical equipment and/or plumbing components are installed.

12. A partition wall for a house building system comprising at least one of the modified OSB boards according to claim 1.

13. The partition wall according to claim 12, comprising an inner core comprising at least one LDF board.

14. The partition wall according to claim 13, wherein at least one side of the inner core is covered by the at least one modified OSB board.

15. A house building system, comprising:
at least one construction wall according to claim 6; and
at least one partition wall.

16. The construction wall according to claim 7, wherein the frame is divided into multiple sub-areas using multiple beams extending within the frame vertical from the one long side to the other long side of the frame parallel to the short sides of the frame.

17. The construction wall according to claim 9, wherein the insulation material comprises wood fiber insulation material.

18. A Modified OSB board (oriented strand board) comprising an upper side and a lower side, wherein the upper side and/or the lower side of the OSB board are coated with at least two paper layers comprising a first paper layer and a second paper layer,
wherein the paper layer being adjacent to a board surface as the first paper layer is impregnated with at least one resin,
wherein the second paper layer is arranged on the first paper layer as a raw paper layer, and
wherein the weight of the raw paper is between 100 and 300 g/m$^2$,
wherein the modified OSB board comprises depressions at different positions along the OSB board on at least one side of the board, and
wherein the depressions have a length between 10 and 30 mm and a width that corresponds to a width of the OSB board.

19. The OSB board according to claim 1, wherein the OSB board includes depressions at different positions along the OSB board on at least one side of the OSB board.

20. The OSB board according to claim 19, wherein the depressions have a length between 10 and 30 mm and a width that corresponds to the width of the OSB board.

21. The OSB board according to claim 20, wherein the pattern of the depressions and the distance between the depressions along the OSB board matches a lath grate to which the OSB boards are fastened.

22. The OSB board according to claim 21, wherein fastening means are arranged within the depressions that can be covered by putty or primer mass.

23. The OSB board according to claim 1, further comprising
a layer of construction material secured to the raw paper wherein the raw construction material consists of one of wallpaper glue, putty and gypsum.

24. Modified OSB board (oriented strand board) comprising an upper side and a lower side,
wherein the upper and/or lower side of the OSB-board are coated with at least two paper layers comprising a first paper layer and a second paper layer,
wherein a paper layer being adjacent to the board surface as first paper layer is impregnated with at least one resin, and
wherein the second paper layer is arranged on the first paper layer as a raw paper layer,
wherein the raw paper layer is not impregnated with resin,
wherein the weight of the raw paper is between 100 and 300 g/m$^2$,
wherein the modified OSB board comprises depressions at different positions along the OSB board on at least one side of the board,
wherein the depressions have a length between 10 and 30 mm and a width that corresponds to a width of the OSB board, and
wherein the OSB board is configured to match a lath grate to which the OSB boards are intended to be fastened, wherein the pattern of the depressions and the distance between the depressions along the OSB board matches said lath grate.

* * * * *